(12) United States Patent
Miryala

(10) Patent No.: US 10,510,033 B2
(45) Date of Patent: Dec. 17, 2019

(54) PROCESSOR AND DATA STORAGE ENABLING EFFICIENT DATA REPORTING

(71) Applicant: Avaya Inc., Santa Clara, CA (US)

(72) Inventor: Sreekanth Miryala, Westminster, CO (US)

(73) Assignee: Avaya Inc., Santa Clara, CA (US)

( * ) Notice: Subject to any disclaimer, the term of this patent is extended or adjusted under 35 U.S.C. 154(b) by 965 days.

(21) Appl. No.: 14/873,412

(22) Filed: Oct. 2, 2015

(65) Prior Publication Data

US 2017/0097965 A1    Apr. 6, 2017

(51) Int. Cl.
*G06F 17/10* (2006.01)
*G06Q 10/06* (2012.01)

(52) U.S. Cl.
CPC ..... *G06Q 10/0639* (2013.01); *G06F 2201/86* (2013.01)

(58) Field of Classification Search
None
See application file for complete search history.

(56) References Cited

U.S. PATENT DOCUMENTS

| 8,221,125 | B2 | 7/2012 | Darling |
| 8,339,901 | B2 | 12/2012 | Haupt et al. |
| 8,737,173 | B2 | 5/2014 | Olson |
| 2007/0201311 | A1* | 8/2007 | Olson ............... H04M 3/5175 368/29 |
| 2010/0161101 | A1* | 6/2010 | Pouyez ............... G06Q 10/10 700/108 |
| 2010/0235218 | A1 | 9/2010 | Erhart et al. |
| 2010/0296417 | A1 | 11/2010 | Steiner |
| 2011/0125793 | A1 | 5/2011 | Erhart et al. |
| 2011/0125826 | A1 | 5/2011 | Erhart et al. |

OTHER PUBLICATIONS

"Converting Time Zones With the At Time Zone Clause," Oracle, 2010, retrieved from http://docs.oracle.com/cd/E18283_01/server.112/e10729/ch4datetime.htm#insertedID10, retrieved on Apr. 13, 2016, 33 pages.

* cited by examiner

*Primary Examiner* — Anhtai V Tran
(74) *Attorney, Agent, or Firm* — Sheridan Ross P.C.

(57) ABSTRACT

Even with modern high-speed processors and bandwidth, many systems implement intensive data reporting components that tax resources. Even very small improvements in reporting efficiencies can result in significant cost and resource savings, as well as improvements in the performance of such resources. Recording facts (e.g., events) with a standardized time and time interval based upon a universal reference, such as Coordinated Universal Time (UTC), and reporting based upon local time and local intervals improves data processing throughput with limited report granularity. For example, since forty-eight intervals comprise most of the world's time zones, reports simply designating facts as occurring within one of the forty-eight intervals and one of the thirty-minute intervals greatly improves operability and throughput.

18 Claims, 10 Drawing Sheets

| TimeZoneKey | DateKey | IntervalKey | UTCDateKey | UTCIntervalKey |
|---|---|---|---|---|
| 12 | 20150225 | 1 | 20150225 | 13 |
| | 20150225 | 2 | 20150225 | 14 |
| | 20150225 | 3 | 20150225 | 15 |
| | 20150225 | 4 | 20150225 | 16 |
| | 20150225 | 5 | 20150225 | 17 |
| | 20150225 | 6 | 20150225 | 18 |
| | 20150225 | 7 | 20150225 | 19 |
| | 20150225 | 8 | 20150225 | 20 |
| | 20150225 | 9 | 20150225 | 21 |
| | ... | ... | ... | ... |
| | 20150225 | 32 | 20150225 | 44 |
| | 20150225 | 33 | 20150225 | 45 |
| | 20150225 | 34 | 20150225 | 46 |
| | 20150225 | 35 | 20150225 | 47 |
| | 20150225 | 36 | 20150225 | 48 |
| | 20150225 | 37 | 20150226 | 1 |
| | 20150225 | 38 | 20150226 | 2 |
| | 20150225 | 39 | 20150226 | 3 |
| | 20150225 | 40 | 20150226 | 4 |
| | 20150225 | 41 | 20150226 | 5 |
| | 20150225 | 42 | 20150226 | 6 |
| | 20150225 | 43 | 20150226 | 7 |
| | 20150225 | 44 | 20150226 | 8 |
| | 20150225 | 45 | 20150226 | 9 |
| | 20150225 | 46 | 20150226 | 10 |
| | 20150225 | 47 | 20150226 | 11 |
| | 20150225 | 48 | 20150226 | 12 |
| | 20150226 | 1 | 20150226 | 13 |
| | 20150226 | 2 | 20150226 | 14 |
| | 20150226 | 3 | 20150226 | 15 |

*FIG. 6*

| TimeZoneKey 702 | DateKey 704 | IntervalKey 706 | DateIntervalKey 802 | UTCDateKey 708 | UTCIntervalKey 710 | UTCDateIntervalKey 804 |
|---|---|---|---|---|---|---|
| 2 | 20150225 | 1 | 2015022251 | 20150225 | 13 | 2015022522 |
| 2 | 20150225 | 2 | 2015022252 | 20150225 | 14 | 2015022523 |
| 2 | 20150225 | 3 | 2015022253 | 20150225 | 15 | 2015022524 |
| 2 | 20150225 | 4 | 2015022254 | 20150225 | 16 | 2015022525 |
| 2 | 20150225 | 5 | 2015022255 | 20150225 | 17 | 2015022526 |
| 2 | 20150225 | 6 | 2015022256 | 20150225 | 18 | 2015022527 |
| 2 | 20150225 | 7 | 2015022257 | 20150225 | 19 | 2015022528 |
| 2 | 20150225 | 8 | 2015022258 | 20150225 | 20 | 2015022529 |
| 2 | 20150225 | 9 | 2015022259 | 20150225 | 21 | 2015022530 |
| ... | ... | ... | ... | ... | ... | ... |
| 2 | 20150225 | 25 | 2015022525 | 20150225 | 44 | 2015022544 |
| 2 | 20150225 | 26 | 2015022526 | 20150225 | 45 | 2015022545 |
| 2 | 20150225 | 27 | 2015022527 | 20150225 | 46 | 2015022546 |
| 2 | 20150225 | 28 | 2015022528 | 20150225 | 47 | 2015022547 |
| 2 | 20150225 | 29 | 2015022529 | 20150225 | 48 | 2015022558 |
| 2 | 20150225 | 30 | 2015022530 | 20150226 | 1 | 201502261 |

PROCESSOR AND DATA STORAGE ENABLING EFFICIENT DATA REPORTING

FIELD OF THE DISCLOSURE

The present disclosure is generally directed toward microprocessor activity and data storage.

BACKGROUND

Data structures are common to computing systems. The management of computing systems, especially for high-capacity systems, is particularly burdensome. For example, certain enterprises have contact centers with sites located in many global locations and requiring the processing, storing, and reporting of, for example, time zone-based data. Present solutions provided by Database Administrators (DBAs) include both the storage of data for each time zone and the storage of the data details. In addition to the processing and storage requirements, the records require a large amount of manual intervention to update the data, such as to record a change due to daylight savings time (DST) or adding another time zone.

Currently, processing and data storage systems, whereby data is stored with redundant information and/or requires the use of additional processing resources, are deployed to accommodate the system inefficiencies from such a computing paradigm.

SUMMARY

It is with respect to the above issues and other problems that the embodiments presented herein were contemplated. Computing resources, such as processors and processing appliances and devices (e.g., servers, blades, distributed systems, computer-on-chip, single core, multi-core, etc.), despite the current and ongoing improvements in performance, remain a limited resource in a computing system. Similarly, despite the advances in faster, larger, and cheaper data storage, even when dynamically allocated, storage remains a limited resource. Accessing stored data, processing the data, and storing the results remains the goal of most computing systems and improvements therein are therefore still sought.

Computing resources may be improved by providing a more efficient data management paradigm that reduces the burden on processing resources, storage resources, and the components providing the connections therebetween (e.g., networks, buses, connections, ports, etc.). Data requiring, in particular, customization in order to produce useful, consistent, and accurate results, contribute significantly to computational inefficiencies. For example, a unit of measure may be recorded in one format (e.g., metric) and need to be utilized in a different unit of measure (e.g., empirical). A data structure may store the units, thereby placing the burden on the processor to make the necessary conversions. Alternatively, the units may be stored in a standard format, which requires processing or verifying that all data units are within a common format, in order to provide consistent data to reports and other processes utilizing the data. More complex data structures, such as those having attributes that can comprise a plurality of values, further exacerbate the issue. For example, time-based reports may comprise data produced in one time zone, reported in another, and compared to data in yet another. Storing all time zones in a single record results in data storage demands for data that are rarely, if ever, accessed. Simply storing the data in a designated time zone, such as Coordinated Universal Time (UTC), requires a processor to access each record for conversion into a usable time zone, which further burdens the processor. Additionally, factors such as Daylight Saving Time (DST) provide further complexity, especially when considering that DST is not uniformly applied (e.g., Arizona and Hawaii do not have DST while most of the United States does) and the date to begin and end DST may change from year to year. Accordingly, in one embodiment of the present invention, an intermediary value is provided that reduces the storage demand and processing demands on a computational system by allowing all data to be recorded in UMT and readily converted to any other time zone.

While the improvements provided by certain embodiments disclosed herein may be negligible in many small-scale computing systems, systems processing thousands to millions or more of records would greatly benefit from the advantages that are provided from the improvements to the computing systems disclosed herein.

To support such a computing architecture, in one embodiment, both detail and aggregate data are stored in UTC and converted to any time zone during run-time based on a time zone map table.

Examples of elements within a time zone map include:

a TIMEZONEKEY—time zone (e.g., an index associated with a time zone);

a DATEKEY—Date Key for UTC date, such as in a YYYYMMDD format;

an INTERVALKEY—day, in UTC data, is divided into a number of intervals. For example, forty-eight intervals within a day accommodates nearly all worldwide time zones; and a UTCDATEKEY—a date will begin and end differently between a UTC and a non-UTC time zone. This column is based on time zone, for example "INTERVALKEY" of 1 UTC may have a Date Key that is 20150225; whereas, for Interval 37, UTCDATEKEY is 20150226. As a result, the days (i.e., 25 versus 26) are different due to the OFFSET for US/Central being UTC-6, whereby the first thirty-six half-hour intervals will fall into a first UTC day, and, following twelve half-hour intervals, fall into the next UTC day.

Additionally, data values such as UTCINTERVALKEY & DATEINTERVALKEYS are concatenations of other fields to pre-configure data records for reporting or additional processing.

Examples of a data model may include the following: a time zone map joined to a data record on DATEINTERVALKEY, which in turn is joined to TIMEZONE, DATE, & INTERVAL.

A user may then select a data, time zone, and interval to be passed to the time zone map to receive the DATEINTERVAL keys. The data is then filtered for up to all time zones.

Additionally, a DateTimeZoneDim (a/k/a Date Time Zone Dimension) table may be created with one minute granularity to support time zones based on historical reporting. This dimension has many rows (e.g., 365 days×24 hours×60 minutes/hour=525,600) compared to a DimTimeZoneMap that only needs 17,566 rows to support one time zone, one row for each thirty-minute interval in a year. Furthermore, it is a more complex operation to join DateTimeZoneDim with event records for reporting as compared to DimTimeZoneMap.

Additionally, multiple synonymous representations of date and time may be presented, down to the minute, for all time zones required for reporting. There is a row in DimTimeZoneMap for each minute in the history of the system and for each time zone in which reporting is configured (i.e., 525,600 rows for each 365-day year for each configured time zone in table TimeZoneDim). This allows all time zone effects to be captured in one dimension that handles not only the effects of different offsets relative to UTC, but also the peculiarities of local daylight saving rules even during the days of transition.

The DimTimeZoneMap may be combined in a single query subject with table DateTimeZoneDim to provide a pseudo-date dimension corresponding to the time zone specified by a report.

In one embodiment, a system is disclosed, comprising: a computer-readable expression of a fact record comprising: a fact detail; a fact date as observed in Coordinated Universal Time (UTC); a fact interval identifying one of a number of day-segment intervals of a calendar date as observed in UTC; and a computer-readable expression of a time zone map comprising a record further comprising: a time zone key indicating a selected global time zone; a date key indicating a UTC date; an interval key identifying one of the number of the day-segmenting intervals; a UTC date key; and a UTC interval key; and wherein the UTC date key and UTC interval keys identify a local date and a local interval for an associated value for the time zone key, date key, and interval key; and a server configured to access a time zone and generate a report for the fact comprising the fact detail and reporting as occurring on the date indicated by the UTC date key and the time of occurrence as the UTC interval key.

In another embodiment, a method is disclosed, comprising: accessing a fact record comprising: a fact detail; a fact date as observed in Universal Coordinated Time (UTC); and a fact interval identifying one of a number of day-segment intervals of a calendar date as observed in UTC; accessing a time zone map comprising a record further comprising: a time zone key indicating a selected global time zone; a date key indicating a UTC date; an interval key identifying one of the number of the day-segmenting intervals; a UTC date key; and a UTC interval key; and wherein the UTC date key and UTC interval keys identify a local date and a local interval for an associated value for the time zone key, date key, and interval key; and generating a report for the fact comprising the fact detail and reporting as occurring on the date indicated by the UTC date key and the time of occurrence as the UTC interval key.

In another embodiment, a non-transitory computer-readable medium is disclosed comprising instructions thereon that when read by a computer cause the computer to perform: accessing a fact record comprising: a fact detail; a fact date as observed in Coordinated Universal Time (UTC); and a fact interval identifying one of a number of day-segment intervals of a calendar date as observed in UTC; accessing a time zone map comprising a record further comprising: a time zone key indicating a selected global time zone; a date key indicating a UTC date; an interval key identifying one of the number of the day-segmenting intervals; a UTC date key; and a UTC interval key; and wherein the UTC date key and UTC interval keys identify a local date and a local interval for an associated value for the time zone key, date key, and interval key; and generating a report for the fact comprising the fact detail and reporting as occurring on the date indicated by the UTC date key and the time of occurrence as the UTC interval key.

The phrases "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The term "computer-readable medium," as used herein, refers to any tangible storage that participates in providing instructions to a processor for execution. Such a medium may take many forms, including, but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid-state medium like a memory card, any other memory chip or cartridge, or any other medium from which a computer can read. When the computer-readable media is configured as a database, it is to be understood that the database may be any type of database, such as relational, hierarchical, object-oriented, and/or the like. Accordingly, the disclosure is considered to include a tangible storage medium and prior art-recognized equivalents and successor media, in which the software implementations of the present disclosure are stored.

The terms "determine," "calculate," and "compute," and variations thereof, as used herein, are used interchangeably and include any type of methodology, process, mathematical operation or technique.

The term "module," as used herein, refers to any known or later-developed hardware, software, firmware, artificial intelligence, fuzzy logic, or combination of hardware and software that is capable of performing the functionality associated with that element. Also, while the disclosure is described in terms of exemplary embodiments, it should be appreciated that other aspects of the disclosure can be separately claimed.

BRIEF DESCRIPTION OF THE DRAWINGS

The present disclosure is described in conjunction with the appended figures:

FIG. 6 depicts a first time zone map in accordance with embodiments of the present disclosure;

FIG. 8 depicts a second time zone map in accordance with embodiments of the present disclosure;

DETAILED DESCRIPTION

The ensuing description provides embodiments only and is not intended to limit the scope, applicability, or configuration of the claims. Rather, the ensuing description will provide those skilled in the art with an enabling description for implementing the embodiments. It will be understood that various changes may be made in the function and arrangement of elements without departing from the spirit and scope of the appended claims.

Any reference in the description comprising an element number, without a subelement identifier when a subelement identifier exists in the figures, when used in the plural, is intended to reference any two or more elements with a like element number. When such a reference is made in the singular form, it is intended to reference one of the elements with the like element number without limitation to a specific one of the elements. Any explicit usage herein to the contrary or providing further qualification or identification shall take precedence.

The exemplary systems and methods of this disclosure will also be described in relation to analysis software, modules, and associated analysis hardware. However, to avoid unnecessarily obscuring the present disclosure, the following description omits well-known structures, components, and devices that may be shown in block diagram form, and are well known, or are otherwise summarized.

For purposes of explanation, numerous details are set forth in order to provide a thorough understanding of the present disclosure. It should be appreciated, however, that the present disclosure may be practiced in a variety of ways beyond the specific details set forth herein.

Figure 1:
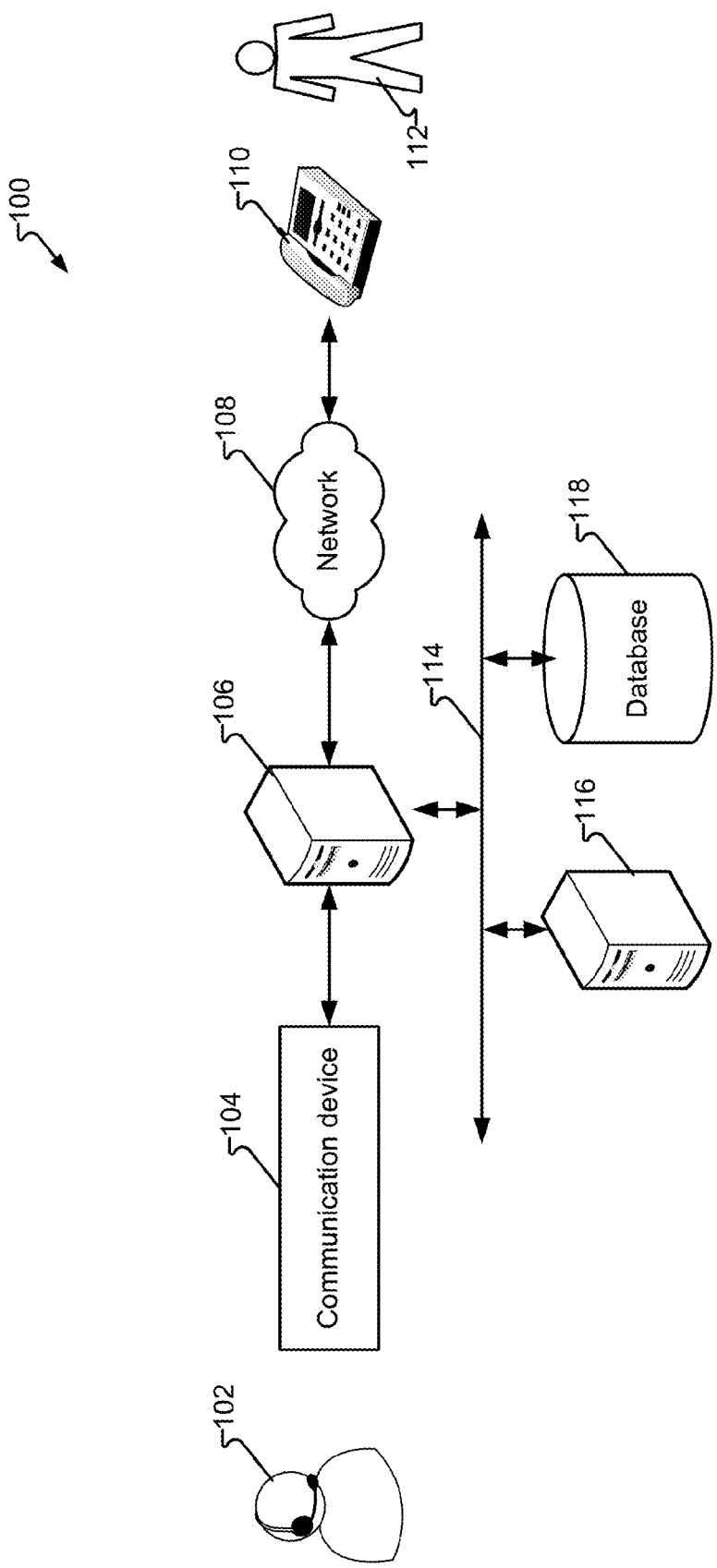
FIG. 1 depicts a first system in accordance with embodiments of the present disclosure.

FIG. 1 depicts system 100 in accordance with embodiments of the present disclosure. In one embodiment, system 100 illustrates certain components utilized in fact gathering and data reporting on those facts. Agent 102 utilizing communication device 104 communicates with a customer 112 who is utilizing communication device 110. Communication device 104 and communication device 110 communicate via component such as communication server 106 and network 108. Network 108 may comprise one or more public or private networks based on switch-based communications, such as public switched telephone networks, or packet-based communications, such as the Internet.

Communication server 106 may be attached to communications infrastructure 114. Communication infrastructure 114 may comprise one or more of an internal network (e.g., Ethernet, Wi-Fi, etc.) and/or component communication system (e.g., bus, backplane, etc.). Communications infrastructure 114 may have a number of additional components attached thereto, such as event server 116 and database 118. Event server 116 may receive events from communication server 106 and cause events received from communication server 106 to be reported as facts into database 118.

Reporting on the facts in database 118 may comprise the translation of data, such as the timestamp associated with the facts therein. For example, recording facts in two or more time zones, such as the local time zone associated with the occurrence of the fact and at least one additional time zone to facilitate reporting of facts outside of the local time zone, results in a significant increase in data storage when database 118 is populated with a large number of facts. Reporting facts in a local time alone requires additional processing outside of the local time zone in order for time and date information to have meaning in a second time zone. Additionally, dates may be a source of confusion as the passage of time from one hour to the next may be a different date in one time zone but the same date in a second time zone.

In another embodiment, facts recorded in database 118 having a detailed timestamp may require an unacceptable demand on resources to store and process such detailed information. However, the facts may not require second or sub-second details and may be aggregated into one of the plurality of intervals. For example, a thirty-minute interval may be associated with one of forty-eight international time zones, which represent a significant portion of the time zones utilized by most countries. An event that occurs between midnight and 12:30 AM may be assigned to interval number one and, as a result, greatly reduce the storage and processing demands for such an event. In a further embodiment, should additional granularity be required, the interval may be subdivided into twenty-two or more constituent components. For example, a thirty-minute interval may be divided up into five minutes of intervals identified as one through six. Therefore, an event occurring at 12:15 AM may be assigned to interval number one and, if implemented, sub-interval three.

Reporting functionality, especially in a different time zone, is greatly simplified by the selection of thirty-minute intervals associated with forty-eight international time zones. As a benefit, resource and processing demands are reduced as an event that occurs in one interval is more readily translated into a second interval. For example, reporting on a fact that occurred in interval 10 (which is ten thirty-minute intervals past the reference) localized for interval twenty (which is twenty thirty-minute intervals past the reference) may be provided by a simple look-up of a time zone map. As a benefit of utilizing a time zone map, which may be previously generated, any transitions from one date to the next may be readily identified without further calculation. The time zone map, and the utilization thereof, is more fully described with respect to the figures below.

Figure 2:
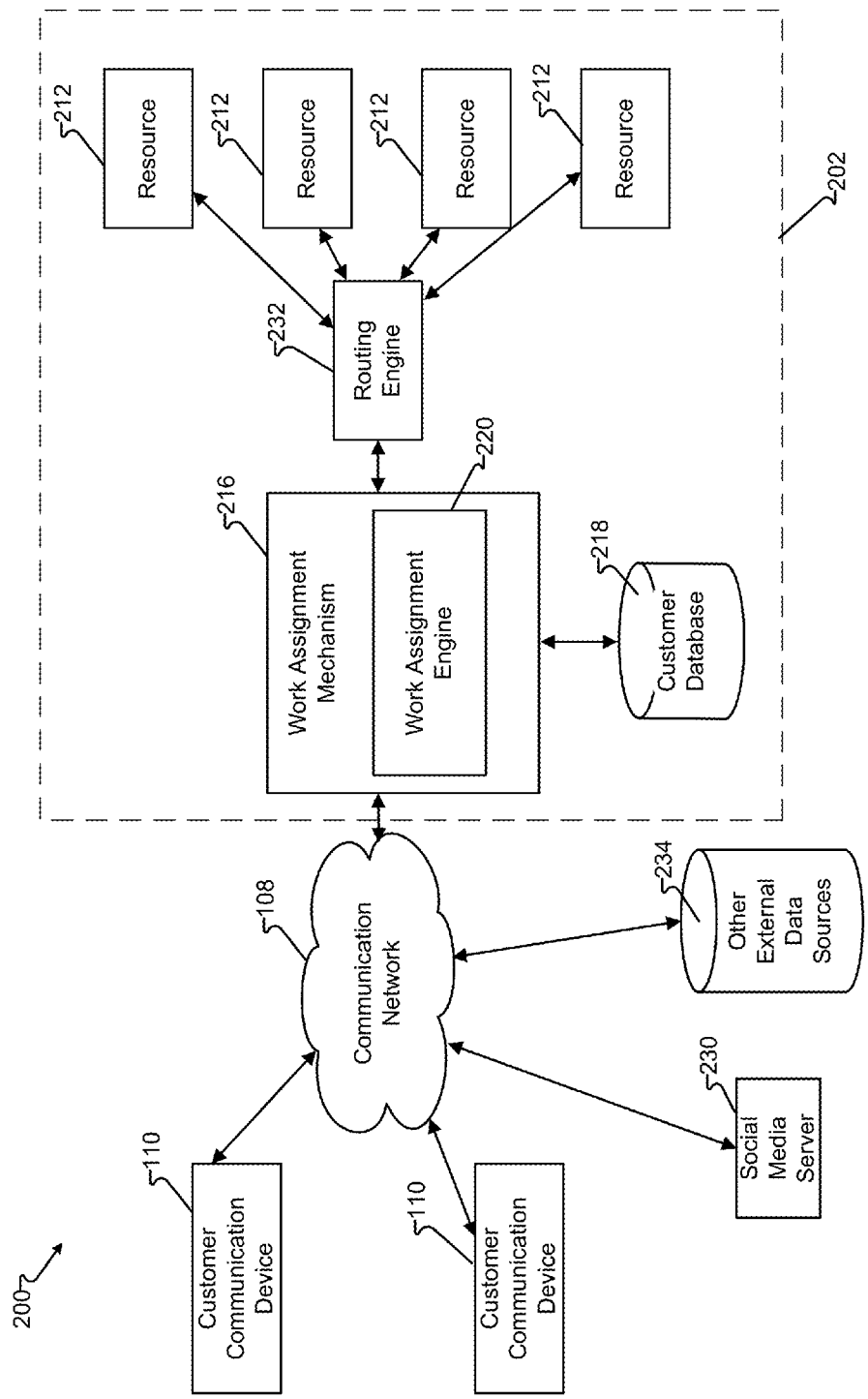
FIG. 2 depicts a second system in accordance with embodiments of the present disclosure.

With reference now to FIG. 2, communication system 200 is discussed in accordance with at least some embodiments of the present disclosure. The communication system 200 may be a distributed system and, in some embodiments, comprises a communication network 108 connecting one or more communication devices 110 to a work assignment mechanism 216, which may be owned and operated by an enterprise administering contact center 202 in which a plurality of resources 212 are distributed to handle incoming work items (in the form of contacts) from customer communication devices 110. Agent 102 and/or communication device 104 may comprise one or more resources 212. In another embodiment, components such as communication server 106 and/or event server 116 may comprise, be comprised by, or co-located with one or more of work assignment mechanism 216, work assignment engine 220, routing engine 232, and/or at least one of resource 212 or in communication therewith, such as via communication infrastructure 114 and/or network 108.

Contact center 202 is variously embodied to receive and/or send messages that are or are associated with work items and the processing and management (e.g., scheduling, assigning, routing, generating, accounting, receiving, monitoring, reviewing, etc.) of the work items by one or more resources 212. The work items are generally generated and/or received requests for a processing resource 212 embodied as, or a component of, an electronic and/or electromagnetically conveyed message. Contact center 202 may include more or fewer components than illustrated and/or provide more or fewer services than illustrated. The border indicating contact center 202 may be a physical boundary (e.g., building, campus, etc.), legal boundary (e.g., company, enterprise, etc.), and/or logical boundary (e.g., resources 212 utilized to provide services to customers for a customer of contact center 202).

Furthermore, the border illustrating contact center 202 may be as-illustrated or, in other embodiments, include alterations and/or more and/or fewer components than illustrated. For example, in other embodiments, one or more of resources 212, customer database 218, and/or other component may connect to routing engine 232 via communication network 108, such as when such components connect via a public network (e.g., Internet). In another embodiment, communication network 108 may be a private utilization of, at least in part, a public network (e.g., VPN); a private network located, at least partially, within contact center 202; or a mixture of private and public networks that may be utilized to provide electronic communication of components described herein. Additionally, it should be appreciated that components illustrated as external, such as social media server 230 and/or other external data sources 234 may be within contact center 202 physically and/or logically, but still be considered external for other purposes. For example, contact center 202 may operate social media server 230 (e.g., a website operable to receive user messages from customers and/or resources 212) as one means to interact with customers 112 via their customer communication device 110.

Customer communication devices 110 are embodied as external to contact center 202 as they are under the more direct control of their respective user or customer 112. However, embodiments may be provided whereby one or more customer communication devices 110 are physically and/or logically within contact center 202, such as when a customer utilizes customer communication device 110 at a kiosk, attaches to a private network of contact center 202 (e.g., WiFi connection to a kiosk, etc.), within or controlled by contact center 202, and are still considered external to contact center 202.

It should be appreciated that the description of contact center 202 provides at least one embodiment whereby the following embodiments may be more readily understood without limiting such embodiments. Contact center 202 may further be altered, added to, and/or subtracted from without departing from the scope of any embodiment described herein and without limiting the scope of the embodiments or claims, except as expressly provided.

Additionally, contact center 202 may incorporate and/or utilize social media website 230 and/or other external data sources 234 may be utilized to provide one means for a resource 212 to receive and/or retrieve contacts and connect to a customer 112 of a contact center 202. Other external data sources 234 may include data sources, such as service bureaus, third-party data providers (e.g., credit agencies, public and/or private records, etc.). Customers may utilize their respective customer communication device 110 to send/receive communications utilizing social media website 230.

In accordance with at least some embodiments of the present disclosure, the communication network 108 may comprise any type of known communication medium or collection of communication media and may use any type of protocols to transport electronic messages between endpoints. The communication network 108 may include wired and/or wireless communication technologies. The Internet is an example of the communication network 108 that constitutes an Internet Protocol (IP) network consisting of many computers, computing networks, and other communication devices located all over the world, which are connected through many telephone systems and other means. Other examples of the communication network 108 include, without limitation, a standard Plain Old Telephone System (POTS), an Integrated Services Digital Network (ISDN), the Public Switched Telephone Network (PSTN), a Local Area Network (LAN), a Wide Area Network (WAN), a Session Initiation Protocol (SIP) network, a Voice over IP (VoIP) network, a cellular network, and any other type of packet-switched or circuit-switched network known in the art. In addition, it can be appreciated that the communication network 108 need not be limited to any one network type, and instead may be comprised of a number of different networks and/or network types. As one example, embodiments of the present disclosure may be utilized to increase the efficiency of a grid-based contact center 202. Examples of a grid-based contact center 202 are more fully described in U.S. Patent Publication No. 2010/0296417 to Steiner, the entire contents of which are hereby incorporated herein by reference. Moreover, the communication network 108 may comprise a number of different communication media, such as coaxial cable, copper cable/wire, fiber-optic cable, antennas for transmitting/receiving wireless messages, and combinations thereof.

The communication devices 110 may correspond to customer communication devices. In accordance with at least some embodiments of the present disclosure, a customer may utilize their communication device 110 to initiate a work item Illustrative work items include, but are not limited to, a contact directed toward and received at a contact center 202, a web page request directed toward and received at a server farm (e.g., collection of servers), a media request, an application request (e.g., a request for application resources located on a remote application server, such as a SIP application server), and the like. The work item may be in the form of a message or collection of messages transmitted over the communication network 108. For example, the work item may be transmitted as a telephone call, a packet or collection of packets (e.g., IP packets transmitted over an IP network), an email message, an Instant Message, an SMS message, a fax, and combinations thereof. In some embodiments, the communication may not necessarily be directed at the work assignment mechanism 216, but rather may be on some other server in the communication network 108 where it is harvested by the work assignment mechanism 216, which generates a work item for the harvested communication, such as social media server 230. An example of such a harvested communication includes a social media communication that is harvested by the work assignment mechanism 216 from a social media network or server 230. Exemplary architectures for harvesting social media communications and generating work items based thereon are described in U.S. patent application Ser. Nos. 12/784,369, 12/706,942, and 12/707,277, filed Mar. 20, 2010, Feb. 17, 2010, and Feb. 17, 2010, respectively, each of which is hereby incorporated herein by reference in its entirety.

The format of the work item may depend upon the capabilities of the communication device 110 and the format of the communication. In particular, work items are logical representations within a contact center 202 of work to be performed in connection with servicing a communication received at contact center 202 (and, more specifically, at the work assignment mechanism 216). The communication may be received and maintained at the work assignment mechanism 216, a switch or server connected to the work assignment mechanism 216, or the like, until a resource 212 is assigned to the work item representing that communication at which point the work assignment mechanism 216 passes the work item to a routing engine 232 to connect the communication device 110, which initiated the communication, with the assigned resource 212.

Although the routing engine 232 is depicted as being separate from the work assignment mechanism 216, the routing engine 232 may be incorporated into the work assignment mechanism 216 or its functionality may be executed by the work assignment engine 220.

In accordance with at least some embodiments of the present disclosure, the communication devices 104, 110 may comprise any type of known communication equipment or collection of communication equipment. Examples of a suitable communication device 104, 110 include, but are not limited to, a personal computer, laptop, Personal Digital Assistant (PDA), cellular phone, smart phone, telephone, or combinations thereof. In general, each communication device 110 may be adapted to support video, audio, text, and/or data communications with other communication devices 104, 110 as well as the processing resources 212. The type of medium used by the communication device 104, 110 to communicate with other communication devices 104, 110 or processing resources 212 may depend upon the communication applications available on the communication device 104, 110.

In accordance with at least some embodiments of the present disclosure, the work item is sent toward a collection of processing resources 212 via the combined efforts of the work assignment mechanism 216 and routing engine 232. The resources 212 can either be completely automated resources (e.g., Interactive Voice Response (IVR) units, processors, servers, or the like), human resources utilizing communication devices (e.g., human agents utilizing a computer, telephone, laptop, etc.), or any other resource known to be used in contact center 202s.

As discussed above, the work assignment mechanism 216 and resources 212 may be owned and operated by a common entity in a contact center 202 format. In some embodiments, the work assignment mechanism 216 may be administered by multiple enterprises, each of which has its own dedicated resources 212 connected to the work assignment mechanism 216.

In some embodiments, the work assignment mechanism 216 comprises a work assignment engine 220, which enables the work assignment mechanism 216 to make intelligent routing decisions for work items. In some embodiments, the work assignment engine 220 is configured to administer and make work assignment decisions in a queueless contact center 202, as is described in U.S. patent application Ser. No. 12/882,950, the entire contents of which are hereby incorporated herein by reference. In other embodiments, the work assignment engine 220 may be configured to execute work assignment decisions in a traditional queue-based (or skill-based) contact center 202.

The work assignment engine 220 and its various components may reside in the work assignment mechanism 216 or in a number of different servers or processing devices. In some embodiments, cloud-based computing architectures can be employed whereby one or more components of the work assignment mechanism 216 are made available in a cloud or network such that they can be shared resources among a plurality of different users. Work assignment mechanism 216 may access customer database 218, such as to retrieve records, profiles, purchase history, previous work items, and/or other aspects of a customer known to contact center 202. Customer database 218 may be updated in response to a work item and/or input from resource 212 processing the work item.

In one embodiment, a message is generated by customer communication device 110 and received, via communication network 108, at work assignment mechanism 216. The message received by a contact center 202, such as at the work assignment mechanism 216, is generally, and herein, referred to as a "contact." Routing engine 232 routes the contact to at least one of resources 212 for processing.

Figure 3:
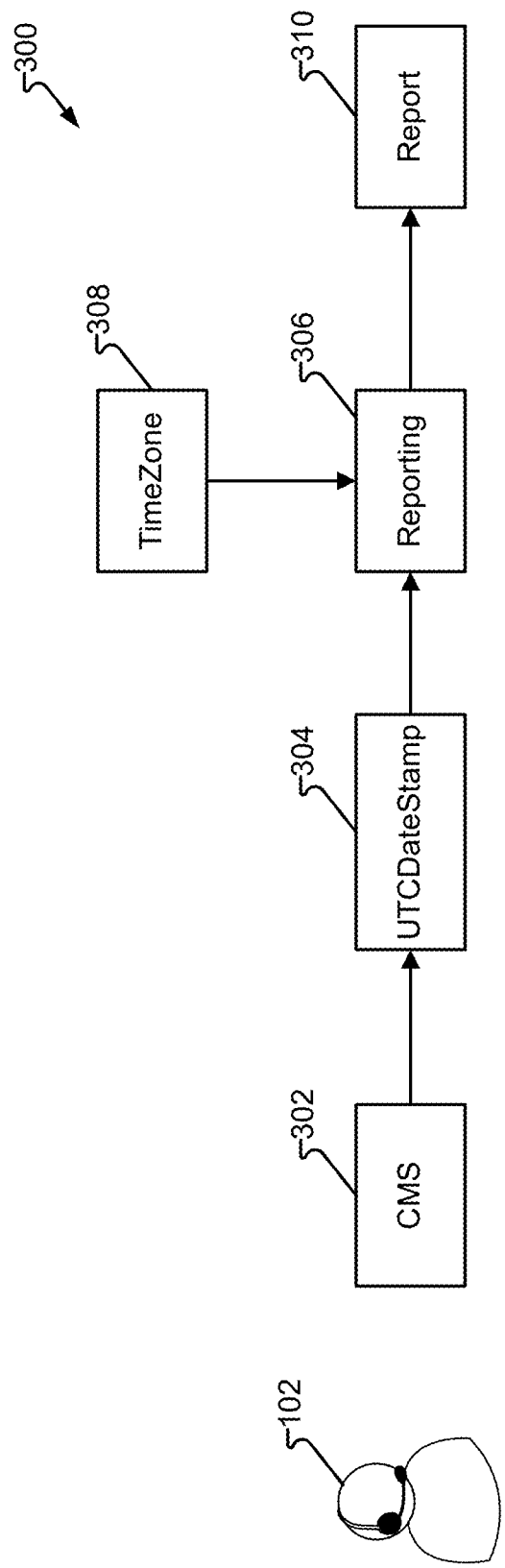
FIG. 3 depicts a third system in accordance with embodiments of the present disclosure.

FIG. 3 depicts system 300 in accordance with embodiments of the present disclosure. System 300 comprises a number of logical and computational elements for the generation of report 310. Agent 102, such as one of resource 212 utilizing communication device 104, performs activities related to customer management system (CMS) 302. For example, agent 102 may initiate or receive calls or other communications to or from a customer, such as customer 112. CMS 302 may utilize a date stamp, such as UTC date stamp 304. The utilization of reference time zones other than UTC is also contemplated by the embodiments herein.

In another embodiment, reporting 306 is initiated, which accesses time zone 308, such that reporting 306 generates report 310 in a time zone, such as that associated with the location of agent 102 or other time zone as may be selected as a matter of choice.

Figure 4:
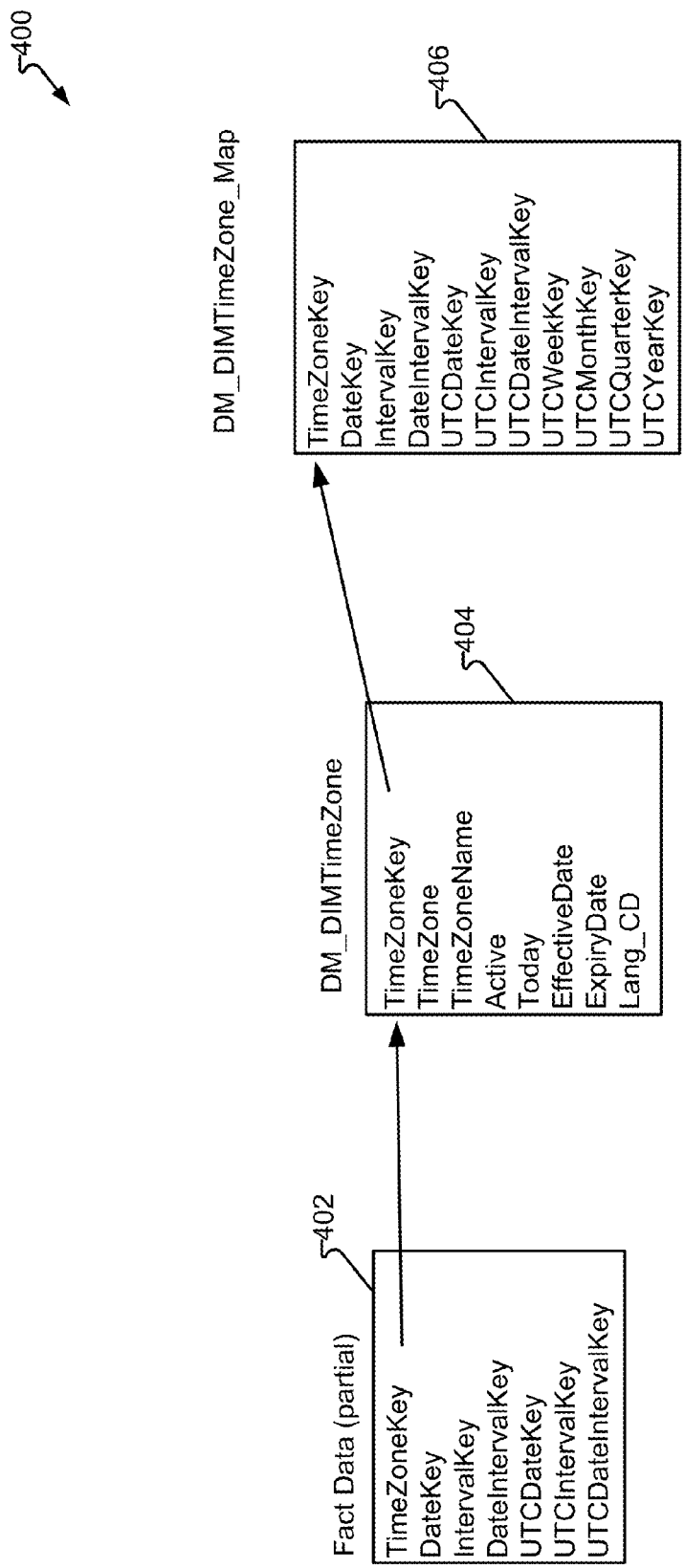
FIG. 4 depicts a database schema in accordance with embodiments of the present disclosure.

FIG. 4 depicts database schema 400 in accordance with embodiments of the present disclosure. In one embodiment, database schema 400 comprises the following tables: fact data 402, time zone table 404, and time zone map 406. Fact data 402 comprises data elements associated with recording an event (e.g., date and time of occurrence, type of event, parties involved, and/or additional information as determined necessary by design choice). Time zone 404 comprises data associated with time zone identification and may optionally include information associated with improved data productivity, such as "today" readily providing a current day and time for a particular time zone. Time zone map 406 comprises records associated with a reference date and time (i.e., a listing of the date and time according to a particular time zone dissimilar to the reporting date and time) and a reporting date and time (i.e., the date and time at which a particular event occurred in a selected time zone). Fact data 402, time zone table 404, and time zone map 406 may be joined such as by the time zone key serving as a primary key.

Figure 5:
FIG. 5 depicts a database table in accordance with embodiments of the present disclosure.

FIG. 5 depicts database table 500 in accordance with embodiments of the present disclosure. Table 500 comprises data elements utilized in a date table. It should be appreciated that the individual data elements of table 500 may comprise more, fewer, or different data elements as a matter of design choice. Table 500 comprises entries to readily provide translation of a date in one format to another or provide specific facts (e.g., day of the week, quarter, etc.) for a particular date.

FIG. 6 depicts time zone map 600 in accordance with embodiments of the present disclosure. In one embodiment, time zone map 600 comprises a plurality of entries, such as time zone key 602, date key 604, interval key 606, UTC date key 608, and UTC interval key 610. Time zone key 602 may be associated with a different data element outside of time zone map 600, such as a record or file associated with one particular time zone. For example, time zone map 600 may exclude time zone key 602 if the entirety of time zone map 600 has been previously associated with a particular time zone, such as time zone 12.

Date key 604 comprises a number of entries associated with a particular date within the time zone identified by time zone key 602. Entry 614 illustrates a transition from one date to another. Interval key 606 identifies a number of segments dividing the dates provided in date key 604. UTC date key 608 and date key 604 translate date key 604 and interval key 606 from the reference time and date (e.g., UTC) to a different time and date (e.g., fact location, report location, etc.) and, optionally, vice versa. Entry 612 illustrates the transition from one day to the next is associated with the reference time and date. For example, a fact being recorded as occurring in UTC date "20150226" in UTCDateKey 608 and having UTCIntervalKey of "1" may then be reported as having a date of "20150225" and an interval of "37."

Figure 7:
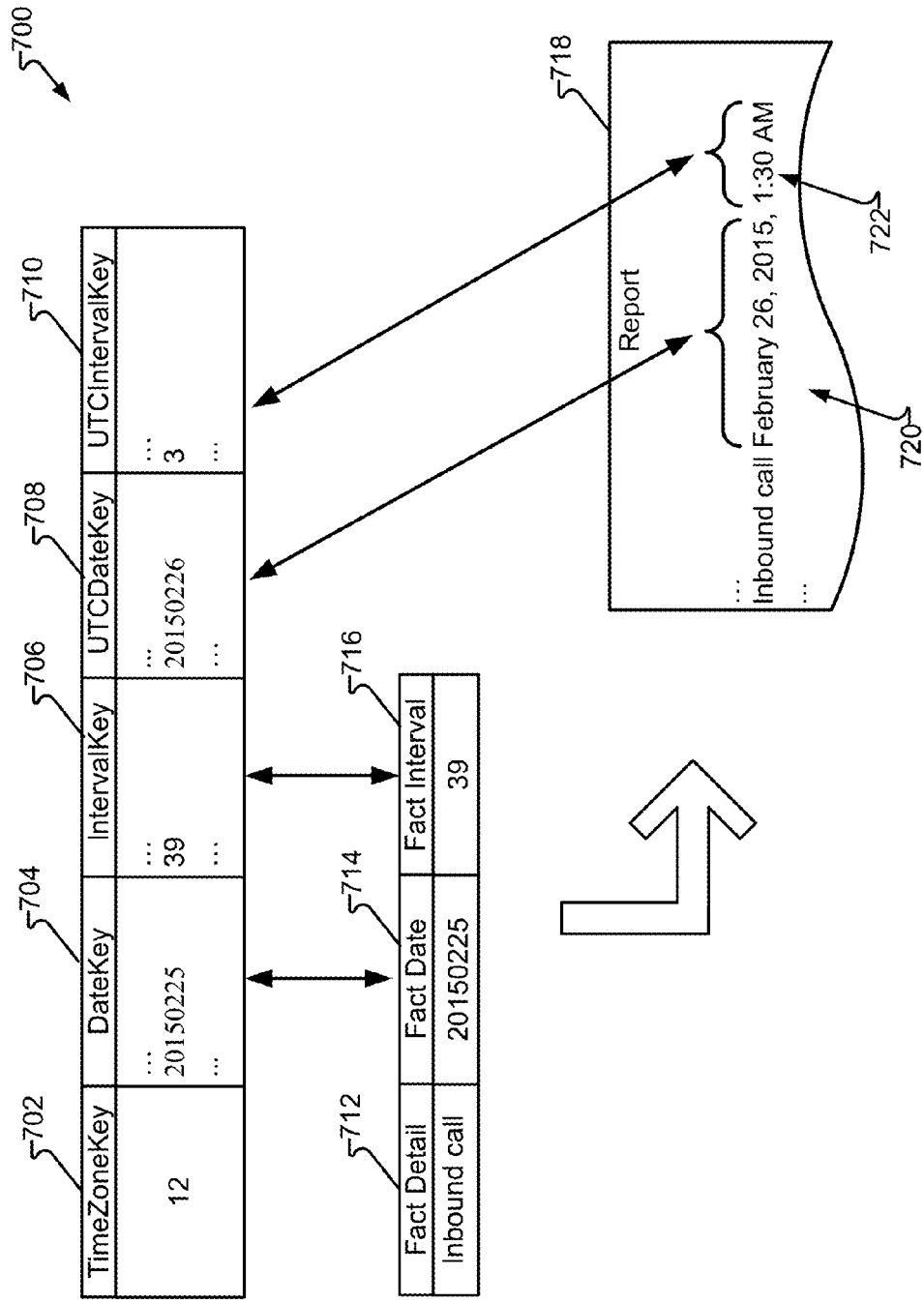
FIG. 7 depicts a first report generation in accordance with embodiments of the present disclosure.

FIG. 7 depicts report generation 700 in accordance with embodiments of the present disclosure. In one embodiment, a fact has been selected for reporting having fact detail 712, fact date 714, in fact interval 716. Fact date 714 and fact interval 716 are recorded with respect to the reference date and time (e.g., UTC). Time zone mapping is provided for a selected time zone (e.g. "12") identified as time zone key 702 and having records date key 704, interval key 706, UTC date key 708, and UTC interval key 710.

Report 718 has been selected in accord with time zone key 702. Fact date 714 and fact interval 716 are identified in entries for key date 704 and interval key 706. The associated UTC date key 708 and UTC interval key 710 are then identified for reporting date 720 and reporting interval 722. Additionally, fact detail 712 may be provided as a line item, aggregation, or other reporting element.

FIG. 8 depicts time zone map 800 in accordance with embodiments of the present disclosure. Time zone map 800 comprises additional data elements, such as may further improve performance in data reporting and/or data storage of facts. In one embodiment, time zone map 800 comprises time zone key 702, date key 704, interval key 706, date interval key 802, UTC date 708, UTC interval key 710, and UTC date interval key 804.

Date interval key 802 comprises a concatenation of date key 704 and interval key 706. UTC date interval key 804 comprises a concatenation of UTC date key 708 and UTC interval key 710. Utilization of date interval key 802 and UTC date interval key 804 may further increase performance as the matching of date and interval may be more simplified as compared to identifying two separate fields, such as date key 704 and interval key 706.

Figure 9:
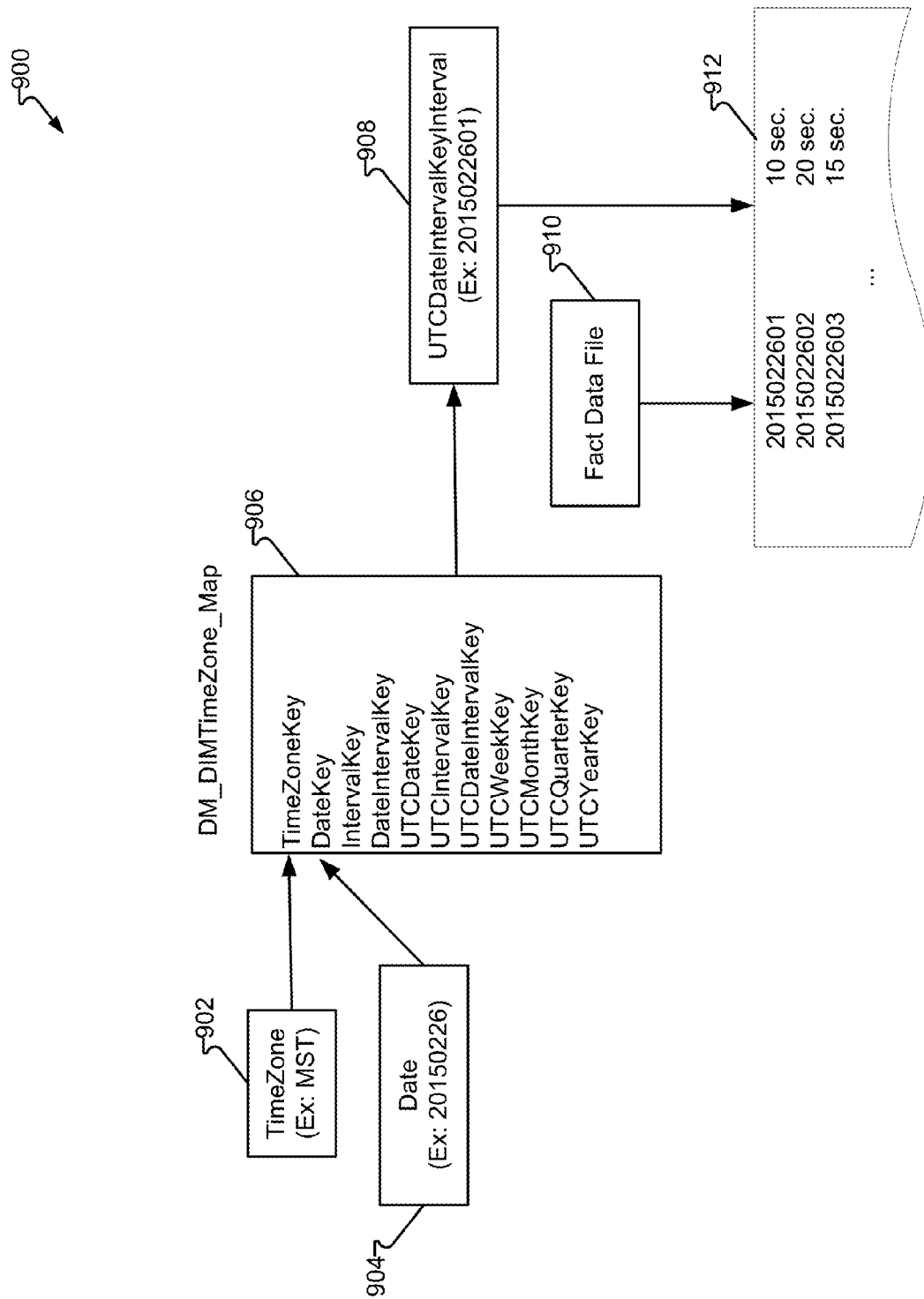
FIG. 9 depicts a second report generation in accordance with embodiments of the present disclosure.

FIG. 9 depicts report generation 900 in accordance with embodiments of the present disclosure. In one embodiment, report generation 900 comprises the matching of keys in a number of data records to produce report 912. For example, a time zone and date are selected and compared to a time zone map 906. Records having entries associated with a corresponding increase in the time zone map are then identified from fact records for inclusion in the report, which may further be formatted in accordance with the selected time zone.

Time zone 902 is compared to a time zone key in time zone map 906 and further associated with the selected date 904. A concatenation is provided as UTC date interval key 908. Fact data 910, having the associated UTC date interval key 908, is then selected for reporting report 912.

Figure 10:
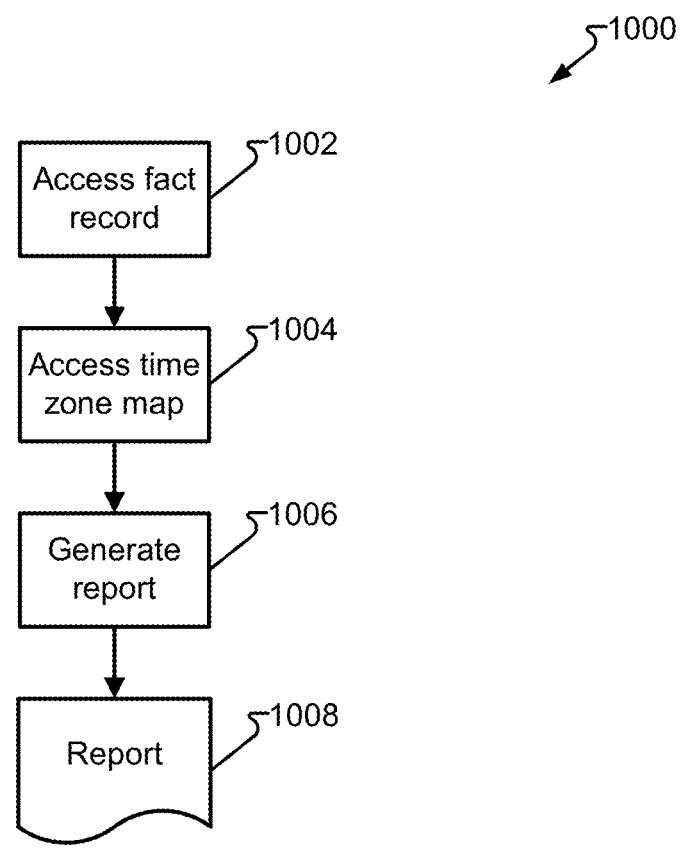
FIG. 10 depicts a process in accordance with embodiments of the present disclosure.

FIG. 10 depicts process 1000 in accordance with embodiments of the present disclosure. In one embodiment, step 1002 accesses a fact record, such as event server 116 accessing database 118 having fact data 910 stored therein. Step 1004 accesses a time zone map, such as time zone map 600, 800, 404, 906 having stored therein a translation of the fact date and time, recorded in a reference time and date (e.g., UTC). Step 1006 accesses a fact record having the reference date and time whereby a report is generated in step 1008.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor (GPU or CPU), or logic circuits programmed with the instructions to perform the methods (FPGA). These machine-executable instructions may be stored on one or more machine-readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Specific details were given in the description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments were described as a process, which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine-readable medium, such as a storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

While illustrative embodiments of the disclosure have been described in detail herein, it is to be understood that the inventive concepts may be otherwise variously embodied and employed, and that the appended claims are intended to be construed to include such variations, except as limited by the prior art.

What is claimed is:

1. A system, comprising:
a computer-readable expression of a fact record comprising:
a fact detail;
a fact date as observed in Coordinated Universal Time (UTC); and
a fact interval identifying one of a number of day-segment intervals of a calendar date as observed in UTC, wherein the number of day-segmenting intervals are uniform and more than five and less than sixty minutes;
a computer-readable expression of a time zone map comprising a record further comprising:
a time zone key indicating a selected global time zone;
a date key indicating a UTC date;
an interval key identifying one of the number of the day-segmenting intervals;
a UTC date key;
a UTC interval key; and
wherein the UTC date key and UTC interval keys identify a local date and a local interval for an associated value for the time zone key, date key, and interval key; and
a server that accesses a time zone and generates a report for the fact comprising the fact detail and translating the fact date and fact interval via accessing the associated combination of the UTC date key and UTC interval key and reporting the fact detail as occurring on the date indicated by the UTC date key and the time of occurrence as the UTC interval key and wherein the server further accesses a date interval key comprising a first concatenation with the date key and wherein the report is generated for facts having a second concatenation comprising the fact date and fact interval and the first concatenation matches the second concatenation.

2. The system of claim 1, wherein the time zone key comprises a value selected from the range of one to the number of day-segment intervals.

3. The system of claim 2, wherein the number of day-segment intervals is forty-eight and the interval key is a thirty-minute interval.

4. The system of claim 1, wherein the fact further comprises a sub-interval unit of time and the server reports the fact as occurring with a value comprised of the sub-interval unit of time and the UTC interval key.

5. The system of claim 1, further comprising a first database comprising the computer-readable expression of the fact record.

6. The system of claim 5, wherein the first database comprises a plurality of the fact records.

7. The system of claim 1, further comprising a second database comprising the computer-readable expression of a time zone map.

8. The system of claim 5, wherein the first database comprises a plurality of the time zone map records, each associated with one time zone.

9. A method, comprising:
accessing a fact record comprising:
a fact detail;
a fact date as observed in Coordinated Universal Time (UTC); and
a fact interval identifying one of a number of day-segment intervals of a calendar date as observed in UTC, wherein the number of day-segmenting intervals are uniform and more than five and less than sixty minutes;
accessing a time zone map comprising a record further comprising:
a time zone key indicating a selected global time zone;
a date key indicating a UTC date;
an interval key identifying one of the number of the day-segment intervals;
a UTC date key;
a UTC interval key; and
wherein the UTC date key and UTC interval keys identify a local date and a local interval for an associated value for the time zone key, date key, and interval key; and
generating a report for the fact comprising the fact detail and translating the fact date and fact interval via accessing the associated combination of the UTC date key and UTC interval key and reporting the fact detail as occurring on the date indicated by the UTC date key and the time of occurrence as the UTC interval key;
creating a first concatenation of the date interval key and the date key; and
creating a second concatenation of the fact date and fact interval; and
wherein generating the report further comprises generating a report for facts associated with the second concatenation matching the first concatenation.

10. The method of claim 9, wherein the time zone key comprises a value selected from the range of one to the number of day-segment intervals.

11. The method of claim 10, wherein number of day-segment intervals is forty-eight and the interval key is a thirty-minute interval.

12. The method of claim 9, wherein the fact further comprises a sub-interval unit of time and the server reports the fact as occurring at a value comprised of the sub-interval unit of time and the UTC interval key.

13. The method of claim 9, further comprising:
receiving the fact detail from a data reporting component;
accessing a UTC time of the fact;
accessing a UTC date of the fact;
storing in the fact record the UTC date as the date; and
storing in the fact record the UTC time divided by the number of day-segment intervals interval as fact interval.

14. A non-transitory computer-readable medium comprising instructions thereon that when read by a computer cause the computer to perform:
accessing a fact record comprising:
a fact detail;
a fact date as observed in Coordinated Universal Time (UTC); and a fact interval identifying one of a number of day-segment intervals of a calendar date as observed in UTC, wherein the number of day-segmenting intervals are uniform and more than five and less than sixty minutes;

accessing a time zone map comprising a record further comprising:
  a time zone key indicating a selected global time zone;
  a date key indicating a UTC date;
  an interval key identifying one of the number of the day-segment intervals;
  a UTC date key; and
  a UTC interval key; and wherein the UTC date key and UTC interval keys identify a local date and a local interval for an associated value for the time zone key, date key, and interval key; and generating a report for the fact comprising the fact detail and translating the fact date and fact interval via accessing the associated combination of the UTC date key and UTC interval key and reporting the fact detail as occurring on the date indicated by the UTC date key and the time of occurrence as the UTC interval key; and accessing a date interval key comprising a first concatenation with the date key and wherein the report is generated for facts having a second concatenation comprising the fact date and fact interval and wherein the first concatenation matches the second concatenation.

15. The non-transitory computer-readable medium of claim 14, wherein the time zone key comprises a value selected from the range of one to the number of day-segment intervals.

16. The non-transitory computer-readable medium of claim 14, wherein number of day-segment intervals is forty-eight and the interval key is a thirty-minute interval.

17. The non-transitory computer-readable medium of claim 14, wherein the fact further comprises a sub-interval unit of time and the instructions further report the fact as occurring at a value comprised of the sub-interval unit of time and the UTC interval key.

18. The non-transitory computer-readable medium of claim 14, further comprising instructions to access a first database comprising the computer-readable expression of the fact record.

* * * * *